United States Patent [19]

Considine et al.

[11] Patent Number: 4,505,541
[45] Date of Patent: Mar. 19, 1985

[54] RODENT-RESISTANT NON-CONDUCTIVE OPTICAL FIBER CABLE

[75] Inventors: Robert J. Considine, Ojai; Joseph F. Schirtzinger, Pasadena; Kenneth M. Stiles, San Dimas, all of Calif.

[73] Assignee: Sea-Log Corporation, Pasadena, Calif.

[21] Appl. No.: 363,796

[22] Filed: Mar. 31, 1982

[51] Int. Cl.³ ............................................. G02B 5/14
[52] U.S. Cl. ................................. 350/96.23; 174/70 R
[58] Field of Search .................... 350/96.23; 174/70 R

[56] References Cited

U.S. PATENT DOCUMENTS 4,317,000  2/1982  Ferer ................................ 350/96.23

Primary Examiner—William L. Sikes
Assistant Examiner—Robert E. Wise
Attorney, Agent, or Firm—Christie, Parker & Hale

[57] ABSTRACT

There is provided a cable construction which resists attack by mammals, fowl or fish. The cable construction consists of a core containing at least one optical fiber about which there is an organic cushion layer, preferably polymeric in nature. About the cushion layer there are a pair of counter-helically wound resin-impregnated inorganic fibers to provide tensile and hoop strength. About the pair of counter-helically wound inorganic fibers there is provided one or more layer(s) of resin-impregnated inorganic fibers helically-wound to an angle greater than 60°, and preferably approaching 90°. These fibers when bitten provide needle-like projections which irritate the mammal, e.g., rodent, fowl or fish and discourage any attempt to continue to attack the cable. The cable is normally provided with an outer casing of a thermoplastic polymer for handling purposes. It may also include a layer containing abrasive materials which also deters attack by mammal, fowl or fish.

36 Claims, 3 Drawing Figures

RODENT-RESISTANT NON-CONDUCTIVE OPTICAL FIBER CABLE

BACKGROUND OF THE INVENTION

The trend with time has been to supplant unsightly transmission poles and overhead transmission lines by underground installations. Underground installations improve appearance of a terrain, and improve security.

With the advent of optical fibers, there has been extensive development and planning for the replacement of copper telephone lines, and even some microwave links, with underground optical fiber cables.

Optical fiber cables greatly increase message load capability, can be installed using only a fraction of the space required by existing electrical conduits, and provide room for expansion. In addition to underground installations, optical fiber cables can be installed undersea and, where subsurface installation is impossible or impractical, even replace aerial cables because of lighter weight and reduced bulk.

One of the major advantages of subsurface, i.e., underground and undersea, optical fiber cables, in addition to high message capacity, is that they utilize a totally dielectric construction, and therefore avoid circulating currents. This eliminates the problems caused by electrolytic corrosion, ground loop currents, and the accidental transmission of dangerous voltages from natural sources such as lightning, or manmade sources such as electromagnetic pulses.

To prevent tampering, it is desirable that underground cable installations, such as computer links, be constructed entirely of non-conductive materials to eliminate the possibility of magnetic or electrical detection of their location.

One of the major problems with totally dielectric optical fiber cables is that they are subject to attack by rodents, such as gophers, for subsurface installation; rats and birds, for above-ground installation; and, when placed in undersea locations, fish and sea mammals.

In the past, the solution to the problem has been the use of metallic armor. However, this cancels the advantage of dielectric optical fiber cables and increases weight, cost and corrosion problems.

The purpose of this invention is, therefore, directed to the development of high-strength optical fiber cables which resist attack by rodents, fowl and fish.

SUMMARY OF THE INVENTION

According to the present invention, there is provided a non-conductive, rodent-resistant optical fiber cable which comprises an inner core defining a cable axis and comprising at least one optical fiber. The inner core is surrounded by an organic cushion layer, preferably polymeric, which dissipates loads that may otherwise be imposed on the optical fiber. About the organic cushion layer is a first layer of helically-wound resin-bonded inorganic fibers wound to a lay angle relative to the cable axis of about 45° or less. A second layer of helically-wound resin-bonded inorganic fibers is also wound to a lay angle of about 45° or less to the cable axis, but in a direction opposite the direction of lay of the first layer of resin-bonded inorganic fibers provided over the first layer of inorganic fibers. The second layer of resin-bonded inorganic fibers may be wound to a lay angle the same as or different from the wrap angle of the first. Preferably the wrap angles of the two are the same. The first and second layers of inorganic fibers provide in combination high tensile strength and hoop strength. There is provided about the second layer of resin-bonded inorganic fibers at least one layer of helically-wound resin-bonded inorganic fibers which are wound to an angle greater than about 60° and less than 90° relative to the cable axis. Besides adding additional hoop strength, the fibers when bitten provide an irritating, needle-like fiber array which deters further attempts of a rodent, fowl or fish to attack on the cable, and thereby protects the inner layers of resin-bonded inorganic fibers and, in particular, the inner core. Layers are preferably wound to cooperate in combination to form a balanced resin-bonded fiber assembly which is substantially non-twisting and non-kinking.

To this base optical fiber cable construction there is normally added at least an outer coating of a polymeric material to facilitate handling. This outer coating can include an abrasive material to provide an initial deterrent to attack by rodent, fowl or fish. Independent of such abrasive layer there is, however, preferably provided an outer polymeric layer which is UV-resistant and relatively smooth for handling purposes.

Any number of layers may be helically wound to an angle between 60° and 90° relative to cable axis to provide irritating, projecting needles of ruptured fibers which deter further attack. Preferably one or two layers are provided.

While any non-metallic inorganic fiber may be employed, it is preferred to employ glass fibers.

It is presently preferred that the optical fiber core be formed of a ruggedized optical fiber comprising an optical fiber surrounded by a room-temperature cured elastomer (cushion layer), such as RTV rubber, which is in turn surrounded by a fiber-reinforced resin shell having a lower coefficient of thermal expansion than the coefficient of thermal expansion of the elastomeric coating. The resin of the shell, having been set while the elastomeric coating is in a thermally expanded state, removes on cooling radial compressive loads on the optical fiber.

Additional cushion layers include thermoplastic polymers such as urethane, polyethylene and the like and are provided to a thickness preferably of from about 0.1 inch to about 0.2 inch. The thickness of the combined layers of fibers of the first, second and additional layers normally ranges from about 0.01 inch to about 0.06 inch, depending upon cable specification.

The fibers of the first and subsequent layers are normally bonded by resin present to a level of from about 20 to about 30 percent by weight resin, based on the weight of the resin and the fibers. Thermoplastic and thermosetting resins may be employed, with epoxy resins being presently preferred.

Polymeric materials employed for the cushion layer and the outer layers are normally thermoplastic, with the outermost layer being UV-resistant or containing UV-resistant additives. The fiber density of any given layer may vary widely, in that the total fiber content provides a balanced, substantially non-kinking, non-twisting construction.

THE DRAWINGS

DETAILED DESCRIPTION

According to the present invention, there is provided a substantially rodent-resistant optical fiber cable.

Figure 1:
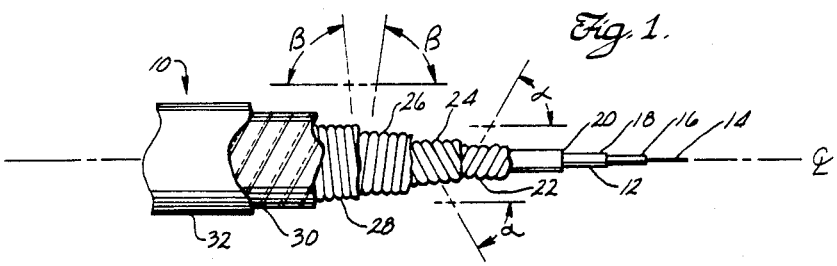
FIG. 1 illustrates one construction of the optical fiber cables provided in accordance with the instant invention.

One preferred construction according to the principles of the present invention is shown in FIG. 1. The optical fiber cable 10 comprises a ruggedized optical fiber core 12 comprising optical fiber 14 surrounded by an elastomeric cushion 16 and fiber-reinforced outer shell 18. A bundle of optical fiber conductors normally in a grouped or spaced parallel configuration may be employed as the core. Details of various core constructions are contained in U.S. Pat. No. 4,113,349 to Stiles, and "*Fiber and Integrated Optics*", Volume 1, Nov. 1, 1977, Hodara, Ed. in Chief., Crane Russak & Company, Inc., New York, both incorporated herein by reference.

The presently preferred ruggedized optical fiber core 12 consists of an optical fiber 14 normally coated with an elastomeric cushion, such as a cured RTV silicone rubber, about a surface coating of 4 to 7 mils of a polyester elastomer, such as Du Pont Hytrel, to protect the fiber. The surrounding elastomeric coating of a room-temperature cured silicone rubber or its equivalent is applied to a thickness of at least about 3 mils and preferably of about 5 mils to about 10 mils. Surrounding the elastomeric coating may be, and preferably is, a fiber-reinforced resin shell. The fibers are preferably glass fibers arranged in a longitudinal parallel configuration to provide high tensile strength. The preferred resins of the shell are thermoset and cured when the elastomer is expanded such that on cooling, compressive loads on the optical fiber are eliminated.

Independent of whether the ruggedized optical fiber core is a base core comprising at least one optical fiber or a core of multiple optical fibers, there is provided an organic cushion layer 20 (which may be the only cushion layer), e.g., of urethane or polyethylene, to a wall thickness of from about 0.1 inch to about 0.2 inch about the core. The cushion, which is normally extruded over the optical fiber assembly, protects the optical fiber conductor from compressive stresses exerted on the cable by external loads, including those exerted by the teeth of a rodent or the like closing on the cable.

The protection provided by the organic cushion is, however, insufficient against penetration by the teeth of a mammal or fish or the bill of a bird because it does not discourage continued attack or attempted penetration.

In accordance with the invention, therefore, cushion layer 20 or its equivalent 16 is covered with a first helically-wound wound layer 22 of resin-reinforced fibers and a second layer of resin-reinforced fibers 24 wound counter-helically around the first layer 22. The first and second layers may be and preferably are, of substantially the same thickness and lay angles to provide a balanced non-kinking and non-twisting cable. The lay angles ($\alpha$) of the first and second layers 22 and 24 are preferably about 45° or less, thereby providing reinforcing fibers with a substantial component in the direction of the centerline ($\mathcal{C}$) for high tensile strength. The preferred range of lay angles is from about 5° to about 45°.

As used herein, "lay angle" refers to the angle between the tangent to a helix and a generator of the cylinder, i.e., a line parallel to the axis (centerline) of the cable upon which the helix lies.

Reinforcing fibers of layers 22 and 24 having lay angles are relied on as providing a combination of tensile and hoop or circumferential strength. Assemblies with lay angles above 45° sacrifice tensile strength while assemblies having lay angles less than about 45° or less have enhanced tensile strength and are preferred. Tensile strength tends to a maximum as lower wrap angles approach 0°. The thickness of the combined layers normally ranges from about 0.01 inch to about 0.06 inch depending upon the strength requirements, cable diameter and fiber diameter. The fibers are bonded with a resin to a level of from about 20 percent to about 30 percent by weight resin based on the weight of the resin and the fibers forming the wraps. The resins may be thermoset or thermoplastic, with thermoset resins preferred.

Thermoplastic resins include polystyrene, acetal resins, polyamides, acrylonitrile styrene butadiene, acrylic resins, vinyl polymers, olefin homopolymers and co-polymers, polyamides and the like, and are normally applied from a melt, e.g., by extrusion.

Thermosetting resins include, among others, epoxy resins, such as epoxidized cyclopentadiene; polyesters; phenolformaldehyde resins; ureaformaldehyde resins; diallyl phthalate resins; silicone resins; phenolfurfural resins; urethane resins; polyimides and the like. They are also applied from a melt. Included in the melt is a high-temperature initiator or hardener which is latent, in respect to initiation of cure while in the molt bath, but at some elevated temperature will initiate and propagate cure of the resin to a thermoset end product. Typical of such hardeners are aromatic amines. Included, as desired, are accelerators, diluent resins, fillers, flame retardants, and the like.

At least one layer of fibers 26 is helically wound around the fiber layer 24 and a fourth layer 28 may be counter-helically wound around the third layer. The third layer may be co-helical or counter-helical to the second layer. The third and fourth layers have substantially the same thickness and lay angles to provide a balanced cable and to lessen the possibility of kinking and twisting of the cable.

The lay angles ($\beta$) of the third and fourth layers are greater than about 60°, with lay angles approaching 90° preferred. Presently preferred angles are from about 80° to about 89°. Reinforcing fibers of layers 26 and 28 are substantially normal to the cable axis and provide protection against attack by mammals, e.g., rodents, fowl and fish.

Figure 2:
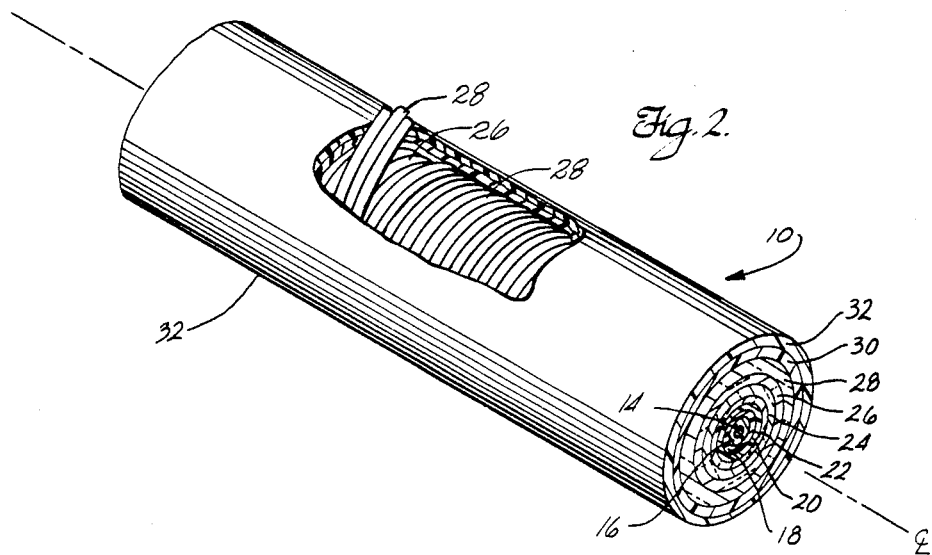
FIG. 2 illustrates how the protective outer layers of fibers, even when ruptured, deter further attack by rodent, fowl or fish.

If the fibers are ruptured, as shown in FIG. 2, they provide "splinters" or irritants to the rodent, bird or fish to deter further attack on the cable assembly.

For small-diameter cables, a rodent may take an entire circumferential portion of the cable in its mouth and attempt to crush the cable. For large-diameter cables, a rodent may attempt to gnaw or chew on the cable. The teeth of the rodent attempting to crush or gnaw on an optical cable close on the cable in a substantially radial direction. Fibers with large lay angles, e.g., above about 60° and less than 90°, are substantially parallel to the direction the teeth of a rodent or fish or the bill of a bird will close when gnawing, chewing or biting the cable. Since this axis is parallel to movement of the teeth or bill, penetration will be difficult, requiring actual breakage of the reinforcing fibers of the third and fourth layers, leading to pulling out of an irritating spike-like group of fibers.

The non-metallic inorganic fibers employed include glass fibers, mineral fibers, carbon fibers, boron fibers, borosilicate fibers and the like. Glass fibers are presently preferred.

The layers of fiber are normally overcoated with one or more outer layers which contain abrasive constituents to further discourage attack by rodents, fowl or fish. There may be employed a wrapped or extruded surrounding layer 30 of a thermoplastic material filled with abrasive constituents such as crushed minerals, ceramics, glass and the like to discourage cable attack by increasing abrasive resistance and friction.

Whether or not an overwrap 30 is employed, there is normally employed an outercoat 32 of UV-resistant polymer such as UV-resistant polyethylene, normally extruded to provide a smooth outer surface to facilitate handling and installation.

Figure 3:
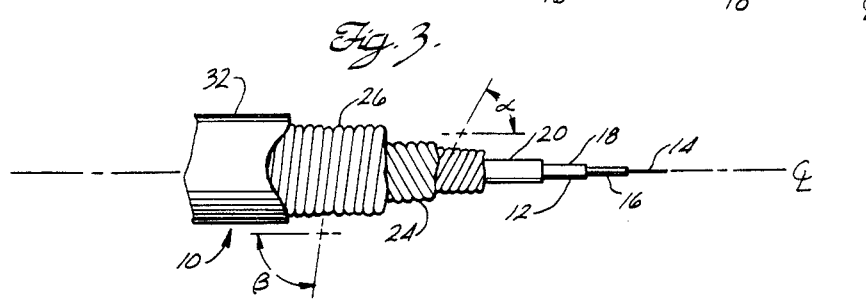
FIG. 3 illustrates another construction employed in accordance with the instant invention.

Another construction is illustrated in FIG. 3. The construction comprises the optical fiber core 12 surrounded by a buffer 20 as described above. Surrounding the dielectric cushion are two layers of counter-helically wound reinforcing fibers 22 and 24 having lay angles of preferably 45° or less. Layers 22 and 24 are unbalanced thicknesses in purposes of eliminating a fourth layer.

A third layer 26 of reinforced fibers is helically wound at an angle greater than 60° around the second layer 24. The third layer may be co-helical or counter-helical to the second layer and wound to a thickness that forms a balanced non-twisting, non-kinking cable that has the same protection against attack.

The optical fiber cables of the instant invention offer advantages not heretofore realized in the art. In addition to extremely low weight and high strength per unit mass or message-carrying capability, they are difficultly detectable when subsurface-installed, e.g., underground or undersea. When laid across the surface of the ground or underground, even without the use of conduits, they offer excellent resistance against damage by the compressive loads of vehicles and the like while still providing full protection against damage by attack by rodents, fowl or fish. Of the three, the most potentially damaging are the rodents, and therefore the cables are normally designed to deter attack by a rodent and will inherently have high resistance to attack by fowl or fish.

Cable diameters can vary widely, ranging from 0.25 inch to well in excess of 1 inch; may carry as part of the core any number of optical fibers; and can be produced using conventional operations on a continuous basis to provide optical fiber cables of any desired length having high tensile strength, high hoop strength, and high resistance to attack. To this end, where there is employed a ruggedized optical fiber core, as described herein in detail, the tensile strength of the fiber-reinforced outer shell 18 adds to the tensile-strength components of helically-wound inorganic fiber layers 22 and 24.

As used herein, by the term "helically-wound" there is meant that the windings are at some angle to the centerline and can vary from an angle greater than 0° to less than 90°. Fibers can be interwoven in a helical form, provided, within the spirit of the invention, that a woven arrangement does not, with respect to the fibers of layers 26 and/or 28, prevent fibers from irritating the attacking rodent, fowl or fish.

In any construction the core can consist solely of an optical fiber 14 and its cushion coating 16, eliminating the need therefore of ruggedizing sheath 18 and cushion 20.

EXAMPLE

Ten mock rodent-resistant cables were prepared for test by the U.S. Department of the Interior. With reference to FIG. 1 elements 12 and 20 were substituted by a ⅜-inch diameter high-density polyethylene rod to act as the cushion 20 for element 12. Each of the four reinforced glass fiber wraps 24, 26, 28, and 30 consisted of #456-E glass, manufactured and sold by Owens-Corning Corporation. Each was impregnated with a cured epoxy resin composed of:

| | |
|---|---|
| Ciba #6010 Epoxy Resin | 77.0% |
| Jeffamine D-230 | 18.3% |
| Jefferson Accelerator #399 | 2.7% |
| Resorcinol | 2.0% |
| | 100.0% |

The resin content of each reinforced glass fiber layer was 24% ±2% by weight. Layer 24 had a lay angle of 45° (right-hand turn) and a thickness of 0.010 inch. Layer 26 had a lay angle of 45° (left-hand turn) and a thickness of 0.010 inch. Layer 28 had a lay angle between 80° and 85° (right-hand turn) and a thickness of 0.010 inch, and layer 30 (left-hand turn) was also at a lay angle between 80° and 85° and a thickness of 0.010 inch.

A urethane outer jacket 32 was applied as a two-part resin by Furane Plastics, and consisted of: Uralane 5738 and Uralane URA with Uni-Cal 66 lamp black.

The cables were rated using test samples. The test ratings were as follows: 0=no damage; 1=jacket scratched; 2=jacket penetrated; 3=armor penetrated; 4=conductor damaged; and 5=cable severed. In nine of the ten samples the armor was not penetrated. In one case there was penetration of the armor, with no damage to the underlying polyethylene. The average rating was 2.1 and the construction was characterized by the reporter as the best non-metallic armor evaluated.

What is claimed is:

1. A non-metallic rodent-resistant optical fiber cable comprising:
   (a) an inner core comprising at least one optical fiber, said inner core defining a cable axis;
   (b) an organic cushion layer surrounding said inner core;
   (c) a first layer of helically-wound resin-bonded inorganic fibers wound about the cushion layer at a first lay angle relative to the cable axis of up to about 45 degrees;
   (d) a second layer of helically-wound resin-bonded inorganic fibers wound about the first layer of helically-wound resin-bonded inorganic fibers at a second lay angle opposite to the direction of lay of the first lay angle and at a lay angle relative to the cable axis of up to about 45 degrees; and
   (e) at least one additional layer of helically-wound resin-bonded inorganic fibers wound about the second layer of helically-wound inorganic fibers at a wrap angle greater than about 60 degrees and less than 90 degrees relative to the cable axis, said layers of helically-wound resin-bonded inorganic fibers cooperating to form a substantially balanced resin-bonded fiber assembly which is substantially non-twisting and non-kinking.

2. An optical fiber cable as claimed in claim 1 in which said additional layer of helically-wound resin-bonded inorganic fibers comprises a third layer of helically-wound resin-bonded inorganic fibers wound about the second layer of helically-wound resin-bonded inorganic fibers at a lay angle opposite the second layer of helically-wound resin-bonded inorganic fibers and a fourth layer of helically-wound resin-bonded inorganic fibers would about the third layer of helically-wound resin-bonded inorganic fibers at a lay angle opposite the third layer of helically-wound resin-bonded inorganic fibers.

3. An optical fiber cable as claimed in claim 2 in which there is provided over the fourth layer of helically-wound resin-bonded inorganic fibers a surrounding layer of an abrasive material.

4. An optical fiber cable as claimed in claim 3 in which there is provided over said surrounding layer of abrasive material a surrounding layer of an ultraviolet radiation-resistant polymeric material.

5. An optical fiber cable as claimed in claim 2 in which there is provided over said fourth layer of helically-wound resin-bonded inorganic fibers a surrounding layer of an ultraviolet radiation-resistant polymeric material.

6. An optical fiber cable as claimed in claim 2 in which the resin content of said first layer of helically-wound resin-bonded inorganic and said second layer of helically-wound resin-bonded inorganic fibers independently contain from about 20 to about 30 percent by weight resin, based on the weight of the resin and the fibers.

7. An optical fiber cable as claimed in claim 2 in which the helically-wound resin-bonded inorganic fibers of said third layer and the helically-wound resin-bonded inorganic fibers of said fourth layer are wound at a lay angle of from about 80 degrees to about 89 degrees to the cable axis.

8. An optical fiber cable as claimed in claim 2 in which the inorganic fibers of said first layer of helically-wound resin-bonded inorganic fibers, said second layer of helically-wound resin-bonded inorganic fibers, said third layer of helically-wound resin-bonded inorganic fibers and said fourth layer of helically-wound resin-bonded inorganic fibers are glass fibers.

9. An optical fiber cable as claimed in claim 2 in which the thermosetting resin is an epoxy resin.

10. An optical fiber cable as claimed in claim 1 in which there is provided over said additional layer of helically-wound resin-bonded inorganic fibers a surrounding layer of an abrasive material.

11. An optical fiber cable as claimed in claim 10 in which there is provided over said surrounding layer of abrasive material a surrounding layer of an ultraviolet radiation-resistant polymeric material.

12. An optical fiber cable as claimed in claim 1 in which there is provided over said additional layer of helically-wound resin-bonded inorganic fibers a surrounding layer of an ultraviolet radiation-resistant polymeric material.

13. An optical fiber cable as claimed in claim 1 in which the organic cushion layer has a wall thickness of from about 0.1 to about 0.2 inch.

14. An optical fiber cable as claimed in claim 1 in which the lay angles of said first and said second layers of helically-wound resin-bonded inorganic fibers are each at an angle of from about 5 degrees to about 45 degrees to the cable axis.

15. An optical fiber cable as claimed in claim 1 in which the resin content of each layer of helically-wound resin-bonded inorganic fibers independently contain from about 20 to about 30 percent by weight resin, based on the weight of the resin and the fibers.

16. An optical fiber cable as claimed in claim 1 in which the helically-wound resin-bonded inorganic fibers of said additional layer are at an angle of from about 80 degrees to about 89 degrees to the cable axis.

17. An optical fiber cable as claimed in claim 1 in which the inorganic fibers of said first layer of helically-wound resin-bonded inorganic fibers and said second layer of helically-wound resin-bonded inorganic fibers and said additional layer of helically-wound resin-bonded inorganic fibers are glass fibers.

18. An optical fiber cable as claimed in claim 1 in which the resin bonding said fibers of said first layer, said second layer and said additional layer of helically-wound resin-bonded inorganic fibers is a thermosetting resin.

19. An optical fiber cable as claimed in claim 1 in which said inner core comprises an optical fiber surrounded by a cured elastomeric layer which is surrounded by an outer shell composed of substantially parallel, longitudinally-oriented, resin-bonded fibers in which the outer shell has a coefficient of thermal expansion less than the coefficient of thermal expansion of the cured elastomeric material in which the resin of the outer shell is set while the elastomeric material is in a thermally expanded state.

20. A non-metallic rodent-resistant optical fiber cable comprising:
   (a) an inner core comprising at least one optical fiber, said inner core defining a cable axis;
   (b) a polymeric cushion layer surrounding said inner core;
   (c) a first layer of helically-wound resin-bonded glass fibers wound about the cushion layer at a first lay angle relative to the cable axis of from about 5 degrees to about 45 degrees;
   (d) a second layer of helically-wound resin-bonded glass fibers wound about the first layer of helically-wound resin-bonded glass fibers at a second lay angle opposite the direction of lay of the first lay angle and at a lay angle relative to the cable axis of from about 5 degrees to about 45 degrees; and
   (e) at least one additional layer of helically-wound resin-bonded glass fibers wound about the second layer of helically-wound resin-bonded glass fibers at a lay angle of from about 80 degrees to about 89 degrees relative to the cable axis, cooperating to form a substantially balanced resin-bonded glass fiber assembly which is substantially non-twisting and non-kinking.

21. An optical fiber cable as claimed in claim 21 in which said additional layer of helically-wound resin-bonded glass fibers comprises a third layer of helically-wound resin-bonded glass fibers wound about the second layer of helically-wound resin-bonded glass fibers at a lay angle opposite the second layer of helically-wound resin-bonded glass fibers and a fourth layer of helically-wound resin-bonded glass fibers wound about the third layer of helically-wound resin-bonded glass fibers at a lay angle opposite the third layer of helically-wound resin-bonded glass fibers.

22. An optical fiber cable as claimed in claim 21 in which there is provided over said additional layer of helically-wound resin-bonded glass fibers a surrounding polymeric layer containing an abrasive material.

23. An optical fiber cable as claimed in claim 22 in which there is provided over said fourth layer of helically-wound resin-bonded glass fibers a surrounding layer of an ultraviolet radiation-resistant polymeric material.

24. An optical fiber cable as claimed in claim 21 in which there is provided over the fourth layer of helically-wound resin-bonded glass fibers a surrounding polymeric layer containing an abrasive material.

25. An optical fiber cable as claimed in claim 24 in which there is provided over said surrounding polymeric layer containing an abrasive material a surrounding layer of an ultraviolet radiation-resistant polymeric material.

26. An optical fiber cable as claimed in claim 21 in which there is provided over said additional layer of helically-wound resin-bonded glass fibers a surrounding layer of an ultraviolet radiation-resistant polymeric material.

27. An optical fiber cable as claimed in claim 26 in which there is provided over said surrounding polymeric layer containing an abrasive material a surrounding layer of an ultraviolet radiation-resistant polymeric material.

28. An optical fiber cable as claimed in claim 26 in which the lay angles of said first and said second layers of helically-wound resin-bonded glass fibers are each at an angle of about 45 degrees to the cable axis.

29. An optical fiber cable as claimed in claim 26 in which the resin content of said layer of helically-wound resin-bonded glass fibers independently contains from about 20 to about 30 percent by weight resin, based on the weight of the resin and the glass fibers.

30. An optical fiber cable as claimed in claim 29 in which the resin bonding said fibers of each layer of helically-wound resin-bonded glass fibers is a thermoset epoxy resin.

31. An optical fiber cable as claimed in claim 21 in which the polymeric cushion layer has a wall thickness of from about 0.1 to about 0.2 inch.

32. An optical fiber cable as claimed in claim 21 in which the resin content of each layer of helically-wound resin-bonded glass fibers independently contains from about 20 to about 30 percent by weight resin, based on the weight of the resin and the glass fibers.

33. An optical fiber cable as claimed in claim 32 in which the resin bonding said fibers of each layer of helically-wound resin-bonded glass fibers is a thermoset epoxy resin.

34. An optical fiber cable as claimed in claim 21 in which the resin bonding said fibers of each layer of helically-wound resin-bonded glass fibers is a thermoset epoxy resin.

35. An optical fiber cable as claimed in claim 21 in which said inner core comprises an optical fiber surrounded by a cured elastomeric layer which is surrounded by an outer shell composed of substantially parallel, longitudinally-oriented, resin-bonded fibers in which the outer shell has a coefficient of thermal expansion less than the coefficient of thermal expansion of the cured elastomeric material in which the resin of the outer shell is set while the elastomeric material is in a thermally expanded state.

36. An optical fiber cable as claimed in claim 20 in which the resin bonding said fibers of each layer of helically-wound resin-bonded glass fibers is a thermoset epoxy resin.

* * * * *